United States Patent
Zhang et al.

(10) Patent No.: US 12,289,742 B2
(45) Date of Patent: Apr. 29, 2025

(54) METHOD AND APPARATUS FOR HYBRID AUTOMATIC RETRANSMISSION REQUEST

(71) Applicant: Lenovo (Beijing) Limited, Beijing (CN)

(72) Inventors: Congchi Zhang, Shanghai (CN); Haipeng Lei, Beijing (CN); Mingzeng Dai, Shanghai (CN); Lianhai Wu, Beijing (CN); Joachim Löhr, Wiesbaden (DE); Hyung-Nam Choi, Ottobrunn (DE)

(73) Assignee: Lenovo (Beijing) Limited, Beijing (CN)

( * ) Notice: Subject to any disclaimer, the term of this patent is extended or adjusted under 35 U.S.C. 154(b) by 98 days.

(21) Appl. No.: 18/250,075

(22) PCT Filed: Oct. 22, 2020

(86) PCT No.: PCT/CN2020/122840
§ 371 (c)(1),
(2) Date: Apr. 21, 2023

(87) PCT Pub. No.: WO2022/082604
PCT Pub. Date: Apr. 28, 2022

(65) Prior Publication Data
US 2024/0008054 A1    Jan. 4, 2024

(51) Int. Cl.
*H04W 72/232* (2023.01)
*H04L 1/1829* (2023.01)
*H04L 1/1867* (2023.01)

(52) U.S. Cl.
CPC ......... *H04W 72/232* (2023.01); *H04L 1/1864* (2013.01); *H04L 1/1896* (2013.01)

(58) Field of Classification Search
CPC ... H04L 1/1864; H04L 1/1896; H04W 72/232
See application file for complete search history.

(56) References Cited

U.S. PATENT DOCUMENTS

| | | | |
|---|---|---|---|
| 8,964,688 B2 * | 2/2015 | Kim | H04L 1/1812 370/330 |
| 11,930,479 B2 * | 3/2024 | Mondal | H04W 16/02 |

(Continued)

FOREIGN PATENT DOCUMENTS

| | | |
|---|---|---|
| CN | 110771247 A | 2/2020 |
| CN | 111801899 A | 10/2020 |

OTHER PUBLICATIONS

CMCC, "Considerations on HARQ for Non-Terrestrial Networks", 3GPP TSG RAN WG1 #99, R1-1912537, Reno, Nevada [retrieved May 22, 2023]. Retrieved from the Internet <https://www.3gpp.org/ftp/tsg_ran/WG1_RL1/TSGR1_99/Docs?sortby=sizerev>., Nov. 2019, 5 Pages.

(Continued)

*Primary Examiner* — Guy J Lamarre
(74) *Attorney, Agent, or Firm* — FIG. 1 Patents (57) ABSTRACT

A method and apparatus for hybrid automatic retransmission request (HARQ) is provided. The method is performed by a first UE. The method includes receiving, from a NodeB, an acknowledge configuration indicating an HARQ scheme of the first UE and uplink resource for the HARQ scheme; determining whether an acknowledgement for a data block associated with a first downlink control information (DCI) is to be transmitted according to the HARQ scheme.

20 Claims, 3 Drawing Sheets

(56) References Cited

U.S. PATENT DOCUMENTS

| | | | |
|---|---|---|---|
| 11,950,250 B2 * | 4/2024 | Li | H04W 72/0446 |
| 2009/0175233 A1 * | 7/2009 | Ojala | H04L 1/1861 |
| | | | 370/329 |
| 2022/0385537 A1 * | 12/2022 | Babaei | H04L 1/1812 |

OTHER PUBLICATIONS

Intel Corporation, "On HARQ feedback support for NR SL", 3GPP TSG-RAN WG2 Meeting #108, R2-1914850, Reno, US [retrieved May 22, 2023]. Retrieved from the Internet <https://www.3gpp.org/ftp/tsg_ran/WG2_RL2/TSGR2_108/Docs>>, Nov. 2019, 3 Pages.

Mediatek Inc., "Reliability Improvement for NR MBS Reception", 3GPP TSG-RAN WG2 Meeting #111 electronic, R2-2006576, Online [retrieved May 22, 2023]. Retrieved from the Internet <https://www.3gpp.org/ftp/TSG_RAN/WG2_RL2/TSGR2_111-e/Docs/>., Aug. 2020, 3 Pages.

Moderator (CMCC), "FL summary on NR Multicast and Broadcast Services", 3GPP TSG RAN WG1 #102-e, R1-2007001, e-Meeting [retrieved May 22, 2023]. Retrieved from the Internet <https://www.3gpp.org/ftp/TSG_RAN/ WG1_RL1/TSGR1_102-e/Docs/>., Aug. 2020, 17 Pages.

PCT/CN2020/122840, "International Preliminary Report on Patentability", PCT Application No. PCT/CN2020/122840, May 4, 2023, 6 pages.

PCT/CN2020/122840, "International Search Report and Written Opinion", PCT Application No. PCT/CN2020/122840, Jul. 9, 2021, 8 pages.

2023-524772, "Foreign Office Action", JP Application No. 2023-524772, Oct. 7, 2024, 8 pages.

Mediatek Inc., "Summary of 7.2.5.4 on more delay-tolerant retransmission mechanisms in NR-NTN", 3GPP TSG RAN WG1 Meeting #98, R1-1909484, Prague, Czech Republic, Aug. 2019, 9 pages.

20958186.7, "European Search Report", Application No. 20958186.7, Jul. 2, 2024, 8 pages.

CMCC, "Discussion on reliability improvement in NR MBS", 3GPP TSG RAN WG1 #102-e R1-2006234 Mobile Competence Centre; 650, Route Des Lucioles; F-06921 Sophia-Antipolis Cedex; France, Aug. 17, 2020, 5 pages.

* cited by examiner

METHOD AND APPARATUS FOR HYBRID AUTOMATIC RETRANSMISSION REQUEST

TECHNICAL FIELD

Embodiments of the present disclosure generally relate to wireless communication technology, especially to a method and apparatus for hybrid automatic retransmission request.

BACKGROUND

The work item on new radio (NR) support of multicast and broadcast services (MBS) was agreed in Release 17 (RP-201038). In RAN3 #109e meeting, it was agreed to use existing next generation-radio access network (NG-RAN) architecture to support NR MBS.

Retransmission may be necessary for data transmission of MBS. In retransmission mechanism, the configuration between transmitter and receiver and the configuration for transmitting feedback are highly considered.

SUMMARY OF THE APPLICATION

Some embodiments of the present disclosure at least provide a technical solution for retransmissions.

Some embodiments of the present disclosure provide a method for hybrid automatic repeat request (HARQ). The method is performed by a first user equipment (UE). The method comprises: receiving, from a NodeB, an acknowledge configuration indicating an HARQ scheme of the first UE and uplink resource for the HARQ scheme; and determining whether an acknowledge for a data block associated with a first downlink control information (DCI) is to be transmitted according to the HARQ scheme.

Some other embodiments of the present disclosure provide a method for HARQ. The method is performed by a NodeB. The method comprises: transmitting an acknowledge configuration indicating an HARQ scheme of a first UE and uplink resource for the HARQ scheme; and transmitting a data block associated with a first DCI.

Some embodiments of the present disclosure also provide an apparatus, including at least one non-transitory computer-readable medium having computer executable instructions stored therein, at least one receiver, at least one transmitter, and at least one processor coupled to the at least one non-transitory computer-readable medium, the at least one receiver, and the at least one transmitter. The computer executable instructions are programmed to implement any method as described, with the at least one receiver, the at least one transmitter, and the at least one processor.

Embodiments of the present disclosure provide a technical solution for retransmissions. Accordingly, embodiments of the present disclosure can provide superior retransmission configuring procedures and superior feedback configuring procedures.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G New Radio (NR), 3GPP long-term evolution (LTE) Release 8 and so on. Persons skilled in the art know very well that, with the development of network architecture and new service scenarios, the embodiments in the present disclosure are also applicable to other similar technical problems.

Figure 1:
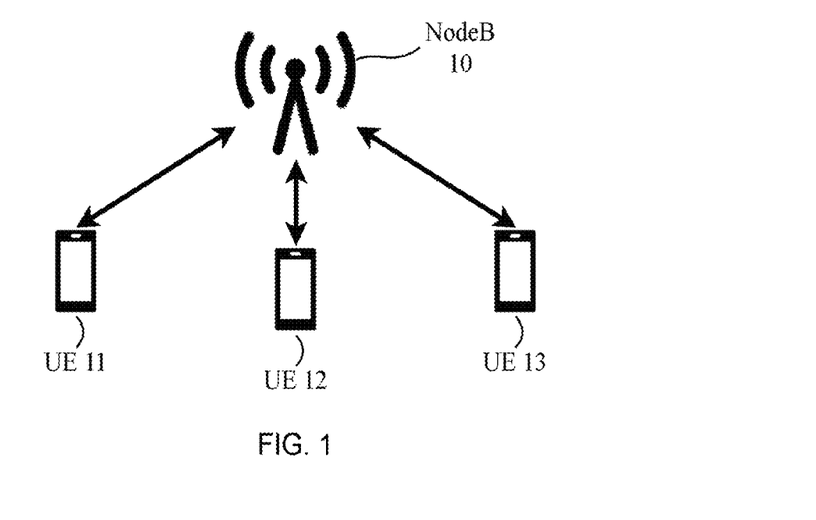
FIG. 1 is a schematic diagram illustrating an exemplary wireless communication system according to some embodiments of the present disclosure.

FIG. 1 is a schematic diagram illustrating an exemplary wireless communication system according to some embodiments of the present disclosure.

FIG. 1 shows communications between UEs and a NodeB. FIG. 1 shows the NodeB 10 and the UEs 11, 12, and 13 for illustrative purpose. The UEs 11, 12, and 13 may be under the coverage of the NodeB 10. As shown in FIG. 1, the NodeB 10 is in communication with the UE 11. The NodeB 10 is in communication with the UE 12. The NodeB 10 is in communication with the UE 13. In some embodiments, the UEs 11, 12, and 13 may join a MBS. The NodeB 10 may transmits data blocks or data packets to the UEs 11, 12, and 13 through unicasting, multicasting, groupcasting, or broadcasting.

For example, the wireless communication system in FIG. 1 may be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G NR network, a satellite communications network, a high altitude platform network, and/or other communications networks.

In some embodiments, the NodeB 10 may be referred to as a base station, a base unit, a base, an access point, an access terminal, a macro cell, an enhanced Node B (eNB), a gNB, a Home Node-B, a relay node, a device, a remote unit, or by any other terminology used in the art. A NodeB may be distributed over a geographic region. Generally, a NodeB is a part of a radio access network that may include one or more controllers communicably coupled to one or more corresponding base stations.

The UEs 11, 12, and 13 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 11, 12, and 13 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 11, 12, and 13 may include wearable devices, such as smart watches, fitness bands, optical head-mounted displays, or the like. Moreover, the UEs 11, 12, and 13 may be referred to as a subscriber unit, a mobile, a mobile station, a user, a terminal, a mobile terminal, a wireless terminal, a fixed terminal, a subscriber station, a user terminal, or a device, or described using other terminology used in the art.

When the NodeB 10 transmits MBS data packets in downlink (e.g., to the UEs 11, 12, and 13), both Point-to-Point (PTP) and Point-to-Multipoint (PTM) modes are supported. The PTP mode means the packet may be transmitted in downlink (DL) by unicasting to a specific UE with Cell-Radio Network Temporary Identifier (C-RNTI). In PTP mode, each of the UEs, 11, 12, and 13 may use a specific C-RNTI. The PTM mode means the packet may be transmitted in downlink by multicasting/groupcasting/broadcasting to a group of UE sharing a common Group-Radio Network Temporary Identifier (G-RNTI). In PTM mode, all of the UEs, 11, 12, and 13 may use one G-RNTI.

To ensure the reliability for services transmitted per multicast/broadcast, HARQ schemes may be applied in the Media Access Control (MAC) layer. There may be three HARQ schemes:

ACK and NACK scheme: a UE transmits an ACK feedback in uplink (UL) when decodes the corresponding Transport Block (TB) successfully, or the UE transmits a NACK otherwise.

NACK-only scheme: a UE transmits a NACK feedback in UL when the UE fails to decode the TB.

Blind retransmission scheme: a NodeB transmits the same TB for multiple times by default and UEs do not transmit any feedback to the NodeB.

To support HARQ schemes and transmit ACK or NACK feedbacks in the UL for multicast/broadcast services, there are some issues to be resolved:

Whether and how to configure the HARQ schemes for a specific MBS service or a UE group, especially considering different UEs might need dedicated UL resource to transmit HARQ feedbacks.

How to configure and assign HARQ processes for MBS transmissions. Given that the HARQ process usage in different UEs could be different, it could be tricky for a NodeB to select the HARQ process, which is available for all UEs, to transmit and retransmit MBS packets per multicast/broadcast.

In NR network, both the dynamic scheduling and the Semi-Persistent Scheduling (SPS) may be supported in DL. For dynamic scheduling, a NodeB may transmits a downlink control information (DCI) in a physical downlink control channel (PDCCH) to instruct the TB reception operation, e.g. when and how to decode the TB.

Semi-persistent scheduling (SPS) is configured by radio resource control (RRC) per serving cell and per bandwidth part (BWP). Multiple assignments can be active simultaneously in the same BWP. Activation and deactivation of the DL SPS are independent among the serving cells. For the DL SPS, a DL assignment is provided by PDCCH, and stored or cleared based on Layer1 signaling, which indicates activation or deactivation of the SPS.

The RRC may configure the following parameters when the SPS is configured:

CS-RNTI: Configured Scheduling-Radio Network Temporary Identifier is for activation, deactivation, and retransmission;

nrofHARQ-Processes: the number of configured HARQ processes for SPS;

harq-ProcID-Offset: Offset of HARQ process for SPS;

periodicity: periodicity of configured downlink assignment for SPS.

The ACK&NACK HARQ scheme may be supported for DL traffic. The following information can be contained in the DCI transmitted from a NodeB to UEs to instruct the HARQ scheme:

The HARQ process ID which is associated with the given DL transmission.

A New Data Indicator (NDI) which indicates that this will be a new transmission or a retransmission of a TB.

A HARQ timing which indicates when should UE send the ACK/NACK feedback in the UL.

Following the instruction from DCI, a UE may deliver the received TB to the corresponding HARQ entity. If it is a new data transmission, a UE may flush the buffer to remove erroneously received packets. If it is a retransmission, a UE may perform a soft combining using erroneously received packets. Based whether the received TB is decoded successfully or not, a UE may transmit an ACK/NACK feedback to the NodeB using the PHY resource indicated by the HARQ timing.

The NR may support HARQ schemes based on transmissions of ACK/NACK (or Discontinuous Transmission (DTX)) for sidelink unicast and groupcast services. The NR may support a NACK-only HARQ scheme particular to groupcast services. In addition, the NR may support blind re-transmission schemes, meaning the transmitting node (e.g., an UE) will transmit the same TB multiple times by default and does not require any HARQ feedback from the receiving node (e.g., an UE).

When the ACK/NACK (or DTX) scheme is used, the sidelink HARQ procedure is similar to the Uu scheme for non-codeblock group feedback, i.e. the HARQ feedback is transmitted based on the success or failure of the whole transport block.

The NACK-only scheme is defined for groupcast to allow a potentially lower sidelink resource demand to be created when a larger number of receiving UEs need to transmit feedback to the same transmitting UE. A typical case is an extended sensors scenario where UEs within a given radius all receive the same sensor information from the transmitting UE, and re-transmission will occur if any UE fails to decode successfully. Since such information may only be relevant within a given radius around the transmitting UE (e.g. a few tens or hundreds of meters around a road junction), the transmission of NACK-only feedback can be restricted to UEs within such a radius, and any UE beyond it does not provide any HARQ feedback. The minimum range requirement of a service is provided together with the associated quality of service (QoS) parameters from service layers.

One bit of sidelink HARQ feedback may be carried on a Physical Sidelink Feedback Channel (PSFCH) from a receiving UE to its transmitting UE. In addition, when under the control of a NodeB in resource allocation mode 1, the transmitting UE informs the NodeB of the status of the sidelink HARQ feedback via a Physical Uplink Control Channel (PUCCH) or a Physical Uplink Shared Channel (PUSCH). The status of the sidelink HARQ feedback has been computed related to a particular dynamic or configured grant to assist the scheduling of re-transmissions and allocation of sidelink resources.

In some cases, an MBS protocol stack option has been proposed. In the MBS protocol stack, one C-RNTI and one G-RNTI are mapped to the same HARQ entity. If an initial transmission is based on a G-RNTI for multicast, the corresponding retransmission may be performed in a multicast mode with a G-RNTI or in a unicast mode with a C-RNTI. A scheduler of a NodeB may dynamically decide whether a multicast HARQ process retransmission is performed with a G-RNTI or a C-RNTI. This requires the UE to be able to perform soft combining between transport blocks belonging to the same multicast HARQ process, in which the retransmission may be performed with different G-RNTI or C-RNTI.

Figure 2:
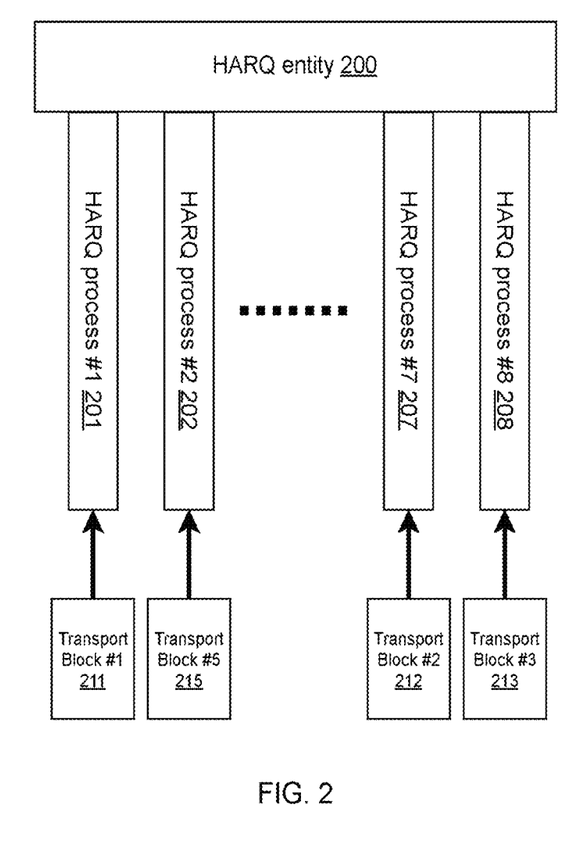
FIG. 2 is a schematic diagram illustrating an exemplary HARQ entity according to some embodiments of the present disclosure.

FIG. 2 is a schematic diagram illustrating an exemplary HARQ entity according to some embodiments of the present disclosure.

In the MAC layer, a MAC entity may include a HARQ entity for each serving cell. Each HARQ entity may maintain a number of parallel HARQ processes. FIG. 2 shows a HARQ entity 200 maintains 8 HARQ processes (i.e., HARQ processes 201 to 208). Each HARQ process may be associated with a HARQ process identifier. In the embodiment of FIG. 2, the HARQ process identifier of HARQ process 201 may be 1; the HARQ process identifier of HARQ process 202 may be 2; and so on. The HARQ entity may direct HARQ information and associated TBs received on a Downlink Shared Channel (DL-SCH) to the corresponding HARQ processes (see section 5.3.2.2 of TS 38.321). In the embodiment of FIG. 2, the transport block #1 211 is directed to the HARQ process #1 201; the transport block #5 215 is directed to the HARQ process #1 201; the transport block #2 212 is directed to the HARQ process #7 207; and the transport block #3 213 is directed to the HARQ process #8 208. The number of parallel DL HARQ processes per HARQ entity may be specified in TS 38.214. The dedicated broadcast HARQ process is used for Broadcast Control Channel (BCCH).

A HARQ process may support one TB when the physical layer is not configured for downlink spatial multiplexing. A HARQ process may support one or two TBs when the physical layer is configured for downlink spatial multiplexing. When the MAC entity is configured with "pdsch-AggregationFactor>1," the parameter pdsch-AggregationFactor provides the number of transmissions of a TB within a bundle of the downlink assignment. Bundling operation relies on the HARQ entity for invoking the same HARQ process for each transmission that is part of the same bundle. After the initial transmission, (pdsch-AggregationFactor–1) HARQ retransmissions follow within a bundle.

The MAC entity shall:
1> if a downlink assignment has been indicated:
2> allocate the TB(s) received from the physical layer and the associated HARQ information to the HARQ process indicated by the associated HARQ information.
1> if a downlink assignment has been indicated for the broadcast HARQ process:
2> allocate the received TB to the broadcast HARQ process.

When a transmission takes place for the HARQ process, one or two (in case of downlink spatial multiplexing) TBs and the associated HARQ information are received from the HARQ entity.

For each received TB and associated HARQ information, the HARQ process shall:
1> if the NDI, when provided, has been toggled compared to the value of the previous received transmission corresponding to this TB; or
1> if the HARQ process is equal to the broadcast process, and this is the first received transmission for the TB according to the system information schedule indicated by RRC; or
1> if this is the very first received transmission for this TB (i.e. there is no previous NDI for this TB):
2> consider this transmission to be a new transmission.
1> else:
2> consider this transmission to be a retransmission.
The MAC entity then shall:
1> if this is a new transmission:
2> attempt to decode the received data.
1> else if this is a retransmission:
2> if the data for this TB has not yet been successfully decoded:
3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if the HARQ process is equal to the broadcast process:
3> deliver the decoded MAC PDU to upper layers.
2> else if this is the first successful decoding of the data for this TB:
3> deliver the decoded MAC PDU to the disassembly and demultiplexing entity.
1> else:
2> instruct the physical layer to replace the data in the soft buffer for this TB with the data which the MAC entity attempted to decode.
1> if the HARQ process is associated with a transmission indicated with a Temporary C-RNTI and the Contention Resolution is not yet successful (see clause 5.1.5); or
1> if the HARQ process is associated with a transmission indicated with a MSGB-RNTI and the Random Access procedure is not yet successfully completed (see clause 5.1.4a); or
1> if the HARQ process is equal to the broadcast process; or
1> if the timeAlignmentTimer, associated with the TAG containing the Serving Cell on which the HARQ feedback is to be transmitted, is stopped or expired:
2> not instruct the physical layer to generate acknowledgement(s) of the data in this TB.
1> else:
2> instruct the physical layer to generate acknowledgement(s) of the data in this TB.

The MAC entity shall ignore NDI received in all downlink assignments on PDCCH for its Temporary C-RNTI when determining if NDI on PDCCH for its C-RNTI has been toggled compared to the value in the previous transmission. Please note that, if the MAC entity receives a retransmission with a TB size different from the last TB size signaled for this TB, the UE behavior is left up to UE implementation.

In some embodiments of the present disclosure, a NodeB may configure the HARQ scheme (i.e. one of ACK&NACK, NACK-only, or blind retransmission). If HARQ feedbacks are necessary for the configured HARQ scheme, the NodeB may configure the corresponding physical (PHY) resources to transmit HARQ feedbacks. The NodeB may transmit an acknowledge configuration indicating an HARQ scheme of a UE and uplink resource for the HARQ scheme per unicast, groupcast or broadcast. The NodeB may configure the HARQ scheme and the corresponding PHY resources for a given MBS service per a combination of PHY signaling and RRC/SIB signaling sent in either unicast, groupcast or broadcast manner. In particular, the NodeB may determine which of the ACK and NACK scheme, NACK-only scheme and blind retransmission scheme is adapted for a UE.

The adopted ACK&NACK or NACK-only scheme may be indicated implicitly by the number of PUCCH resources provided. For example, the ACK&NACK scheme is adopted if two PUCCH resources are provided. The NACK-only scheme is adopted if only one PUCCH resource is provided. The blind retransmission is adopted if no PUCCH resource is provided. Alternatively, the adopted HARQ scheme may be explicitly indicated by an indicator of one or two bits. For example, "00" indicates that the blind retransmission scheme is adopted; "01" indicates that the NACK-only scheme is adopted; and "10" indicates that the ACK&NACK scheme is adopted.

The cases related to the MBS data transmission per multicast/broadcast radio bearer are described below.

In the case that the dynamic scheduling (associated with a G-RNTI) and the ACK&NACK HARQ scheme are adopted, the NodeB may configure the HARQ scheme and the corresponding UL resources for a given network identifier (e.g. G-RNTI) per dedicated RRC (which is signaled to each UE once a UE joins the MBS session). Then, the DCI for the actual MBS data block (or packet) transmission may be transmitted in a multicast/broadcast way. It is worth noting that the UEs joining the MBS may be configured with different HARQ schemes and different UL resources for transmitting ACK or NACK.

In the case that the dynamic scheduling (associated with a G-RNTI) and the NACK-only scheme or the blind retransmission HARQ scheme are adopted, the NodeB may configure the HARQ scheme and the corresponding UL resources for a given network identifier (e.g. G-RNTI) per dedicated RRC (which is signaled to each UE once a UE joins the MBS session). Then, the DCI for the MBS data block (or packet) transmission may be sent in a multicast/broadcast way.

In the case that the dynamic scheduling (associated with a G-RNTI) and the NACK-only scheme or the blind retransmission HARQ scheme are adopted, the NodeB may configure the HARQ scheme and the corresponding UL resources in the multicast/broadcast DCI for the MBS data block (or packet) transmission. The involved UEs may use the same UL resource to transmit NACK-only feedback, thus the common UL resource may be provided by the multicast/broadcast DCI.

In the case that the semi-persistent scheduling (associated with a G-RNTI/CS-RNTI) and the ACK&NACK HARQ scheme are adopted, the NodeB may configure the HARQ scheme and the corresponding UL resources for a given identifier (e.g. G-RNTI or CS-RNTI) per dedicated RRC (which is signaled to each UE once a UE joins the MBS session). Then, the activation/deactivation DCI for the MBS scheduling may be sent in a multicast/broadcast way.

In the case that the semi-persistent scheduling (associated with a G-RNTI/CS-RNTI) and the NACK-only scheme or the blind retransmission HARQ scheme are adopted, the NodeB may configure the HARQ scheme and the corresponding UL resources for a given identifier (e.g. G-RNTI or CS-RNTI) per dedicated RRC (which is signaled to each UE once a UE joins the MBS session). Then, the activation/deactivation DCI for the MBS data block (or packet) transmission may be sent in a multicast/broadcast way.

In the case that the semi-persistent scheduling (associated with a G-RNTI/CS-RNTI) and the NACK-only scheme or the blind retransmission HARQ scheme are adopted, the NodeB may configure the HARQ scheme and the corresponding UL resources in the activation/deactivation DCI (which is broadcast or multicast to each UE) for the MBS data block (or packet) transmission. The involved UEs may use the same UL resource to transmit NACK-only feedback, thus the common UL resource may be provided by the multicast/broadcast DCI.

The cases related to the MBS data transmission per unicast radio bearer are described below.

In the case that the dynamic scheduling (associated with a C-RNTI) is adopted, the HARQ scheme and the corresponding UL resource for a UE may be configured per DCI signaling that unicasts to each UE.

In the case that the semi-persistent-scheduling (associated with a CS-RNTI) is adopted, the HARQ scheme and the corresponding UL resource for a UE may be configured per activation/deactivation DCI signaling that unicasts to each UE.

For the cases that the UEs are in RRC_INACTIVE/IDLE state, the HARQ scheme and the corresponding UL resource for the UEs may be configured per activation/deactivation DCI signaling that unicasts to each UE.

In some embodiments of the present disclosure, the initial transmission and retransmission of the same MBS TB may be scrambled using different RNTIs and then mapped to the same HARQ process.

In some embodiments, MBS data blocks (or packets) and non-MBS data blocks (or packets) may share the same HARQ processes. That is, there may be no HARQ processes dedicated for MBS data blocks in the embodiments. The UE may distinguish MBS data blocks and non-MBS data blocks based on different DCI formats when the data blocks are scrambled with a C-RNTI. In some embodiments, an additional indicator may be contained in the DCI.

In one embodiment, a NodeB may instruct DL data transmissions for MBS data and non-MBS data but assigned to the same HARQ process ID. For example, the NodeB may transmit DCI #1 for data block #1 of MBS service and transmit DCI #2 for data block #2 of non-MBS service. DCI #1 may include a MBS-indicator and HARQ process #1 (i.e., the HARQ process ID). DCI #2 may include a non-MBS-indicator and HARQ process #1 (i.e., the HARQ process ID). When the UE receives data block #1 and data block #2, the UE may be able to recognize that data block #1 and data block #2 are different data blocks even though the data blocks are assigned to the same HARQ process by the NodeB.

In some embodiments, the UE may store the received data blocks to the same HARQ process. Since the data blocks stored in the same HARQ process are distinguishable, the UE may receive later possible retransmissions and perform soft combining as usual.

In some embodiments, the UE may decide to store the received data block #1 and data block #2 to two different HARQ processes which are available now. The two HARQ processes of the UE may be different from that the NodeB appoints in the DCI (i.e., HARQ process #1). In some embodiments, one of the two HARQ processes of the UE may be the same as that the NodeB appoints in the DCI (i.e. HARQ process #1 in this case).

In some embodiments, one or more dedicated HARQ processes may be assigned for the reception of MBS data blocks. The NodeB may explicitly configure the dedicated HARQ process(es) to a UE per dedicated RRC signaling or per groupcast/broadcast SIB message. The NodeB may provide a mapping between G-RNTI and the corresponding HARQ process(s). Wherein multiple HARQ processes may be represented by a HARQ process ID range or a list of HARQ process IDs.

In the case that one single dedicated HARQ process is assigned for one or more G-RNTIs, when the NodeB transmits or retransmits a MBS data block scrambled with a G-RNTI, the NodeB may not indicate the HARQ process ID in the relevant DCI. This is because the UE already knows the HARQ process corresponding to the one or more G-RNTIs.

In the case that one single dedicated HARQ process is assigned for one or more G-RNTIs, when the NodeB transmits or retransmits a MBS data block scrambled with a C-RNTI, the NodeB may indicate the MBS dedicated HARQ process ID in the relevant DCI.

In some embodiments, if the initial transmission is scrambled with a G-RNTI per multicast/broadcast radio bearer and if the retransmission of the same TB is scrambled with a C-RNTI per unicast radio bearer, the same HARQ process ID and a NDI value are included in the DCI for multicast/broadcast transmission and in the DCI for retransmission. Each unicast HARQ transmission may be performed in a separate HARQ process. However, according to some embodiments, the NodeB may use the HARQ process selected for the initial transmission and also use the same HARQ process for the corresponding one or more unicast HARQ retransmissions to the different receiving UEs. For each one of the unicast HARQ retransmissions that are for different receiving UEs, the NodeB may select a different redundancy version. Even though the only one (and the same) HARQ process selected for the initial multicast/broadcast transmission is also used for each of the multiple unicast retransmissions to different UEs, the NodeB may maintain an independent HARQ status/context, e.g. RV, NDI status, received HARQ feedback, for each of the receiving UEs. Only if all of the receiving UEs have successfully received the TB, the HARQ process may be used for a new TB transmission, e.g. initial transmission.

In some embodiments, one or more dedicated HARQ entities may be assigned for the reception of MBS data blocks. The NodeB may explicitly configure the one or more dedicated HARQ entities to a UE per dedicated RRC signaling or groupcast/broadcast SIB message. The NodeB may also provide a mapping between G-RNTI and the corresponding one or more HARQ entities.

In the case that a UE receives a MBS data block scrambled with a G-RNTI, the UE may deliver or store the data block to the HARQ process of the corresponding HARQ entity.

In the case that the NodeB transmits or retransmits a MBS data block per unicast scrambled with a C-RNTI, an indicator may be added in the relevant DCI, in which the indicator points to a specific MBS HARQ entity. Such indicator may be an HARQ entity index or the relevant G-RNTI. Then, once the UE receives the corresponding data block, the UE may deliver or store the data block to the HARQ process of the appointed HARQ entity.

The present disclosure provides the methods and corresponding apparatus (e.g., a UE or a NodeB) to configure HARQ scheme and corresponding UL resources to UE to support HARQ operations for MBS retransmission per a combination of PHY signaling and RRC/SIB signaling sent in either unicast, groupcast or broadcast manner. Also, the NodeB may configure a UE with one or more HARQ processes dedicated for a specific MBS data block transmission. The present disclosure may simplify necessary operations to ensure initial transmission and retransmission to be assigned to the same HARQ process for all associated UEs.

Figure 3:
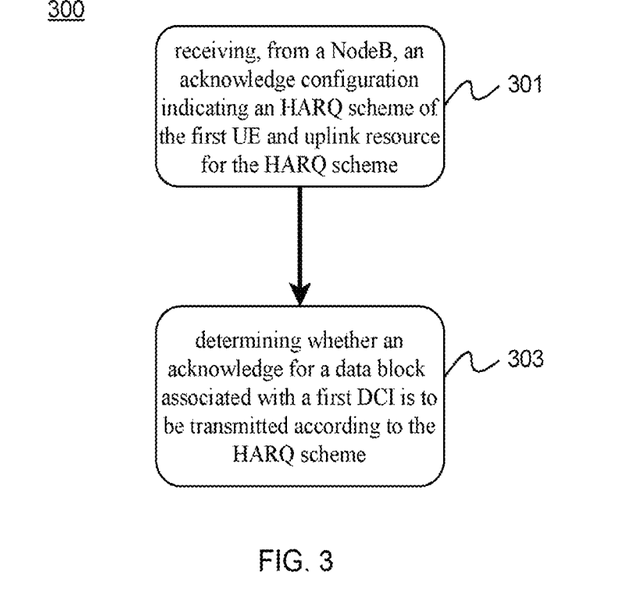
FIG. 3 is a flowchart of a method for HARQ according to some embodiments of the present disclosure.

FIG. 3 is a flowchart of a method 300 according to some embodiments of the present disclosure. The method 300 may be performed by a first UE. In some embodiments, the first UE may be one of the UEs 11, 12, and 13.

In operation 301 of the exemplary method 300 shown in FIG. 3, the first UE may receive an acknowledge configuration from a NodeB. The acknowledge configuration may indicate an HARQ scheme of the first UE and uplink resource for the HARQ scheme. The acknowledge configuration may be transmitted or sent through at least one of unicast, groupcast, and multicast.

In operation 303, the first UE may determine whether an acknowledge for a data block associated with a first downlink control information (DCI) is to be transmitted according to the HARQ scheme. The HARQ scheme may be the ACK and NACK scheme, NACK-only scheme or blind retransmission scheme. If the blind retransmission scheme is configured, no acknowledge for the data block should be transmitted by the UE. The first UE may also determine how to transmit an acknowledge for a data block associated with a first DCI according to the HARQ scheme.

In some embodiments of the method 300, the acknowledge configuration may be indicated with a network identifier. The network identifier may be transmitted in a RRC signaling message. The method 300 may further comprise receiving the first DCI indicating an initial transmission of the data block.

In some embodiments of the method 300, the acknowledge configuration may be indicated in the first DCI. In some embodiments, a DCI may include a network identifier, indicating the acknowledge configuration.

In some embodiments of the method 300, the acknowledge configuration may be broadcast in a system information block (SIB) message. The method 300 may further comprise receiving the first DCI indicating a transmission of the data block. The acknowledge configuration may be broadcasted in a SIB message for the UE in RRC_Inactive/IDLE state. In some embodiments, a SIB message may include a network identifier indicating the acknowledge configuration.

In some embodiments of the method 300, the HARQ scheme may be indicated by the number of allocated resources of the uplink resource for the HARQ scheme.

In some embodiments of the method 300, the acknowledge configuration may be received after the first UE join a MBS session.

In some embodiments, the method 300 may further comprise receiving a second DCI; and receiving a retransmission of the data block according to the second DCI.

In some embodiments, the method 300 may further comprise transmitting the acknowledgement through a common uplink resource allocated by the acknowledge configuration.

In some embodiments, the method 300 may further comprise receiving a third DCI including information related to a service and a first HARQ process identifier indicative of a first HARQ process. The third DCI may include a first format for a MBS service and a second format for a non-MBS service. The third DCI may include an indicator indicative of a type of the service. In some embodiments, the method 300 may further comprise: receiving initial transmissions of data blocks of different types of service; storing the initial transmissions into a second HARQ process; receiving retransmissions of at least one of the data blocks; storing the retransmissions into the second HARQ process; and performing a soft combining for one of the initial transmission and the corresponding one of the retransmissions. The initial transmissions may be assigned to the first HARQ process by the NobeB. The retransmissions may be assigned to the first HARQ process by the NobeB. The initial transmission and the corresponding retransmission of the soft combining may belong to the same service. Mapping between the first HARQ process and the second HARQ process may be stored at the first UE. The second HARQ process may be identical to the first HARQ process.

In some embodiments, the method 300 may further comprise: receiving data blocks of first service type; storing the data blocks of the first service type a second HARQ process; receiving data blocks of second service type; and storing the data blocks of the second service type a third HARQ process. The data blocks of the first service type may be assigned to the first HARQ process by the NobeB. The data blocks of the second service type may be assigned to the first HARQ process by the NobeB. Mapping between the first type service and the second HARQ process may be stored at the first UE. Mapping between the second type service and the third HARQ process may be stored at the first UE. One of the second HARQ process and the third HARQ process may be identical to the first HARQ process.

In some embodiments, the method 300 may further comprises: receiving a HARQ process configuration for a RRC signaling message or a SIB message. The method 300 may further comprises: storing an initial transmission of the data block and a retransmission of the data block into a HARQ process. The method 300 may further comprises: mapping the first network identifier to a first HARQ process; and receiving the data block associated with the first network identifier. Receiving the data block may including receiving an initial transmission and/or a retransmission of the data block. The first network identifier may be a G-RNTI. The data block may be scrambled with the first network identifier. The method 300 may further comprises: receiving a fourth DCI including a first HARQ process identifier; and receiving the data block associated with a second network identifier according to the first HARQ process identifier. Receiving the data block may including receiving an initial transmission and/or a retransmission of the data block. The second network identifier may be a C-RNTI. The data block may be scrambled with the second network identifier.

In some embodiments of the method 300, the first DCI may include a first HARQ process identifier and a new data indicator. The first HARQ process identifier may be indicative of a first HARQ process. An initial transmission of the data block may be associated with the first network identifier. The initial transmission of the data block may be performed through multicast, groupcast, or broadcast. The initial transmission of the data block may be scrambled with the first network identifier. The first network may be a G-RNTI. The first UE may receive a fifth DCI including the first HARQ process identifier and the new data indicator. A retransmission of the data block may be associated with a second network identifier. The retransmission of the data block may be performed through unicast. The retransmission of the data block may be scrambled with the second network identifier. The first network may be a C-RNTI. The fifth DCI may include the first HARQ process identifier and a first redundancy version (RV). The first UE may receive the retransmission of the data block via a first unicast communication. A second UE may receive a sixth DCI including the first HARQ process identifier and a second RV. The second UE may receive the retransmission of the data block via a second unicast communication. The first HARQ process may be used for a new data block when no retransmission of the data block is necessary. Only if the NodeB asserts that all of the receiving UEs have successfully received the TB, the HARQ process may be used for a new data block (e.g., an initial transmission of the next data block).

In some embodiments, the method 300 may further comprises: receiving a HARQ entity configuration for a RRC signaling message or a SIB message. The method 300 may further comprises: mapping an initial transmission of the data block and a retransmission of the data block to a HARQ entity. The method 300 may further comprises: mapping the first network identifier to a first HARQ entity; receiving the data block associated with the first network identifier; and delivering the data block to a HARQ process of the first HARQ entity. The first network may be a G-RNTI. The data block may be scrambled with the first network identifier. Receiving the data block may include receiving an initial transmission and/or a retransmission of the data block. The method 300 may further comprises: receiving a seventh DCI including a first HARQ entity indicator indicating a first HARQ entity; receiving the data block associated with a second network identifier; and delivering the data block to a HARQ process of the first HARQ entity. The first HARQ entity indicator may include an HARQ entity index and a third network identifier relevant to the second network identifier. Receiving the data block may include receiving an initial transmission and/or a retransmission of the data block. The data block may be scrambled with the second network identifier. The second network identifier may be a C-RNTI. The third network identifier may be a relevant G-RNTI.

Figure 4:
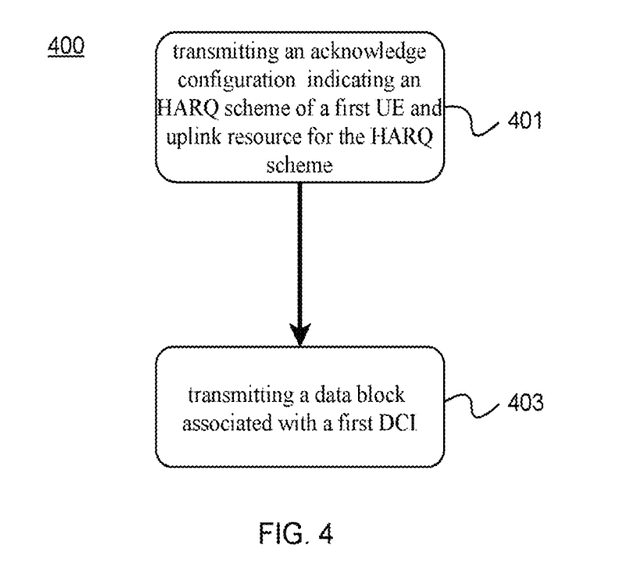
FIG. 4 is a flowchart of a method for HARQ according to some embodiments of the present disclosure.

FIG. 4 is a flowchart of a method 400 according to some embodiments of the present disclosure. The method 400 may be performed by a NodeB. In some embodiments, the NodeB may be the NodeB 10.

In operation 401, the NodeB may transmit an acknowledge configuration. The acknowledge configuration may indicate an HARQ scheme of a first UE and uplink resource for the HARQ scheme. The acknowledge configuration may be transmitted or sent through at least one of unicast, groupcast, and multicast.

In operation 403, the NodeB may transmit a data block associated with a first downlink control information (DCI). The data block may be transmitted or sent through at least one of unicast, groupcast, and multicast.

In some embodiments of the method 400, transmitting the acknowledge configuration may include: broadcasting the acknowledge configuration to UEs; groupcasting the acknowledge configuration to a group of UEs; and unicasting the acknowledge configuration to a UE.

In some embodiments of the method 400, the acknowledge configuration is indicated with a first network identifier transmitted in a RRC signaling message. The method may further comprise transmitting the first DCI indicating an initial transmission of the data block. The first network identifier may be a G-RNTI or a CS-RNTI.

In some embodiments of the method 400, the acknowledge configuration may be indicated in and transmitted with the first DCI. In some embodiments, a DCI may include a "network identifier."

In some embodiments of the method 400, the acknowledge configuration may be broadcasted in a SIB message. The method 400 may further comprise transmitting the first DCI indicating a transmission of the data block. The acknowledge configuration may be broadcasted in a SIB message for the UE in RRC_Inactive/IDLE state. In some embodiments, a SIB message may include a "network identifier."

In some embodiments of the method 400, the HARQ scheme may be indicated by the number of allocated resources of the uplink resource for the HARQ scheme.

In some embodiments, the method 400 may further comprise: the acknowledge configuration may be transmitted after the first UE join a MBS session.

In some embodiments, the method 400 may further comprise: transmitting (or broadcasting) a second DCI; and retransmitting the data block according to the second DCI.

In some embodiments, the method 400 may further comprise: receiving an acknowledgement through a common uplink resource allocated by the acknowledge configuration.

In some embodiments, the method 400 may further comprise transmitting a third DCI including information related to a service and a first HARQ process identifier indicative of a first HARQ process. The establishment confirmation may be an end-to-end confirmation in a PC5-RRC message or a PC5-S message. The third DCI includes a first format for a MBS service and a second format for a non-MBS service. The third DCI includes an indicator indicative of a type of the service. In some embodiments, the method 400 may further comprise: transmitting initial transmissions of data blocks of different types of service; and transmitting retransmissions of at least one of the data blocks. The initial transmissions may be assigned to the first HARQ process by the NobeB. The retransmissions may be assigned to the first HARQ process by the NobeB.

In some embodiments, the method 400 may further comprise: transmitting data blocks of first service type; and transmitting data blocks of second service type. The data blocks of the first service type may be assigned to the first HARQ process by the NobeB. The data blocks of the second service type may be assigned to the first HARQ process by the NobeB.

In some embodiments, the method 400 may further comprise: transmitting a HARQ process configuration for a RRC signaling message or a SIB message. The method 400 may further comprise: storing an initial transmission of the data block and a retransmission of the data block into a HARQ process. The method 400 may further comprise: mapping the first network identifier to a first HARQ process; and transmitting the data block associated with the first network identifier. Transmitting the data block may including transmitting an initial transmission and/or a retransmission of the data block. The first network identifier may be a G-RNTI. The data block may be scrambled with the first network identifier. The method 400 may further comprises: transmitting a fourth DCI including a first HARQ process identifier; and transmitting the data block associated with a second network identifier according to the first HARQ process identifier. Transmitting the data block may including transmitting an initial transmission and/or a retransmission of the data block. The second network identifier may be a C-RNTI. The data block may be scrambled with the second network identifier.

In some embodiments of the method 400, the first DCI may include a first HARQ process identifier and a new data indicator. The first HARQ process identifier may be indicative of a first HARQ process. An initial transmission of the data block is associated with the first network identifier. The initial transmission of the data block may be performed through multicast, groupcast, or broadcast. The initial transmission of the data block may be scrambled with the first network identifier. The first network may be a G-RNTI. The NodeB may transmit a fifth DCI including the first HARQ process identifier and the new data indicator. The NodeB may transmit a retransmission of the data block associated with a second network identifier. The retransmission of the data block may be performed through unicast. The retransmission of the data block may be scrambled with the second network identifier. The first network may be a C-RNTI. The NodeB may transmit the fifth DCI to a first UE. The fifth DCI may include the first HARQ process identifier and a first redundancy version (RV). The NodeB may transmit the retransmission of the data block to the first UE via a first unicast communication. The NodeB may transmit a sixth DCI to a second UE. The sixth DCI may include the first HARQ process identifier and a second RV. The NodeB may transmit the retransmission of the data block to the second UE via a second unicast communication. The first HARQ process may be used for a new data block when no retransmission of the data block is necessary. Only if the NodeB asserts that all of the receiving UEs have successfully received the TB, the HARQ process may be used for a new data block (e.g., an initial transmission of the next data block).

In some embodiments, the method 400 may further comprises: transmitting a HARQ entity configuration for a RRC signaling message or a SIB message. The method 400 may further comprises: mapping an initial transmission of the data block and retransmission of the data block to a HARQ entity. The method 400 may further comprises: mapping the first network identifier to a first HARQ entity; and transmitting the data block associated with the first network identifier. The first network may be a G-RNTI. The data block may be scrambled with the first network identifier. Transmitting the data block may include Transmitting an initial transmission and/or a retransmission of the data block. The method 400 may further comprises: transmitting a seventh DCI including a first HARQ entity indicator indicating a first HARQ entity; and transmitting the data block associated with a second network identifier. The first HARQ entity indicator includes an HARQ entity index and a third network identifier relevant to the second network identifier. Transmitting the data block may include transmitting an initial transmission and/or a retransmission of the data block. The data block may be scrambled with the second network identifier. The second network identifier may be a C-RNTI. The third network identifier may be a relevant G-RNTI.

Figure 5:
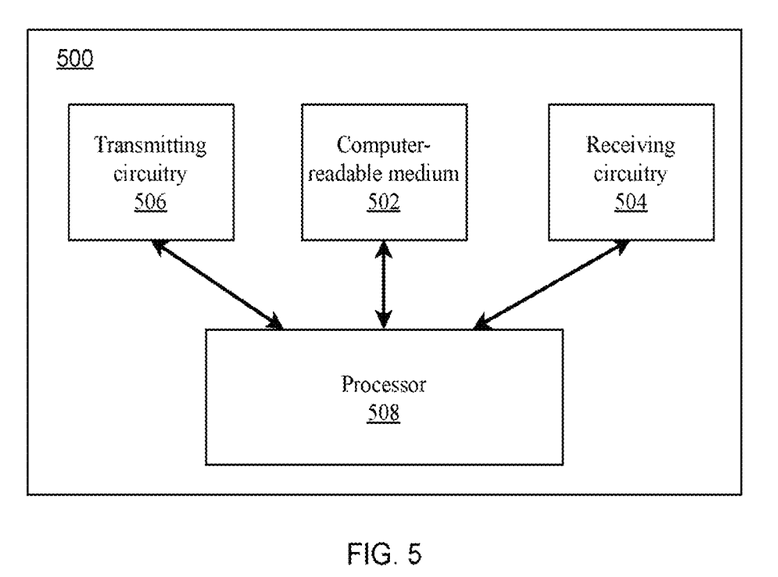
FIG. 5 is a simplified block diagram of an apparatus for HARQ according to some embodiments of the present disclosure.

FIG. 5 is a simplified block diagram of an apparatus 500 according to some embodiments of the present disclosure. The apparatus 500 may be the NodeB 10 or one of the UEs 11, 12, and 13.

Referring to FIG. 5, the apparatus 500 may include at least one non-transitory computer-readable medium 502, at least one receiving circuitry 504, at least one transmitting circuitry 506, and at least one processor 508. Some embodiments of the present disclosure comprise at least one receiving circuitry 504 and at least one transmitting circuitry 506 and are integrated into at least one transceiver. The at least one non-transitory computer-readable medium 502 may have computer executable instructions stored therein. The at least one processor 508 may be coupled to the at least one non-transitory computer-readable medium 502, the at least one receiving circuitry 504 and the at least one transmitting circuitry 506. The computer executable instructions can be programmed to implement a method with the at least one receiving circuitry 504, the at least one transmitting circuitry 1606 and the at least one processor 508. The method can be a method according to any embodiment of the present disclosure, for example, one of the methods shown in FIGS. 3 and 4.

Some embodiments of the present disclosure may be disclosed below:

Embodiment 1: A method for hybrid automatic repeat request (HARQ), the method performed by a first UE (user equipment) and comprising:
  receiving, from a NodeB, an acknowledge configuration indicating an HARQ scheme of the first UE and uplink resource for the HARQ scheme; and
  determining whether an acknowledgement for a data block associated with a first downlink control information (DCI) is to be transmitted according to the HARQ scheme.

Embodiment 2: The method of Embodiment 1, wherein the acknowledge configuration is indicated with an network identifier transmitted in a RRC signaling message, and the method further comprises receiving the first DCI indicating an initial transmission of the data block.

Embodiment 3: The method of Embodiment 1, wherein the acknowledge configuration is indicated in the first DCI.

Embodiment 4: The method of Embodiment 1, wherein the acknowledge configuration is broadcast in a SIB message and the method further comprises receiving the first DCI indicating a transmission of the data block.

Embodiment 5: The method of Embodiment 1, wherein the HARQ scheme is indicated by the number of allocated resources of the uplink resource for the HARQ scheme.

Embodiment 6: The method of Embodiment 1, wherein the acknowledge configuration is received after the first UE join a MBS session.

Embodiment 7: The method of Embodiment 1, further comprising:
  receiving a second DCI; and
  receiving a retransmission of the data block according to the second DCI.

Embodiment 8: The method of Embodiment 1, further comprises:
  transmitting the acknowledgement through a common uplink resource allocated by the acknowledge configuration.

Embodiment 9: The method of Embodiment 1, further comprising: receiving a third DCI including information related to a service and a first HARQ process identifier indicative of a first HARQ process.

Embodiment 10: The method of Embodiment 9, wherein the third DCI includes a first format for a MBS service and a second format for a non-MBS service.

Embodiment 11: The method of Embodiment 10, wherein the third DCI includes an indicator indicative of a type of the service.

Embodiment 12: The method of Embodiment 9, further comprising:
  receiving initial transmissions of data blocks of different types of service, wherein the initial transmissions are assigned to the first HARQ process by the NobeB;
  storing the initial transmissions into a second HARQ process;
  receiving retransmissions of at least one of the data blocks, wherein the retransmissions are assigned to the first HARQ process by the NobeB;
  storing the retransmissions into the second HARQ process; and
  performing a soft combining for one of the initial transmission and the corresponding one of the retransmissions,
  wherein the initial transmission and the corresponding retransmission of the soft combining belong to the same service, and
  wherein mapping between the first HARQ process and the second HARQ process is stored at the first UE.

Embodiment 13: The method of Embodiment 12, wherein the second HARQ process is identical to the first HARQ process.

Embodiment 14: The method of Embodiment 9, further comprising:
  receiving data blocks of first service type, wherein the data blocks of the first service type are assigned to the first HARQ process by the NobeB;
  storing the data blocks of the first service type a second HARQ process;
  receiving data blocks of second service type, wherein the data blocks of the second service type are assigned to the first HARQ process by the NobeB; and
  storing the data blocks of the second service type a third HARQ process,
  wherein mapping between the first type service and the second HARQ process and mapping between the second type service and the third HARQ process are stored at the first UE.

Embodiment 15: The method of Embodiment 14, wherein one of the second HARQ process and the third HARQ process is identical to the first HARQ process.

Embodiment 16: The method of Embodiment 1, further comprising: receiving a HARQ process configuration for a RRC signaling message or a SIB message.

Embodiment 17: The method of Embodiment 16, further comprising:
  storing an initial transmission of the data block and a retransmission of the data block into a HARQ process.

Embodiment 18: The method of Embodiment 16, further comprising:
  mapping the first network identifier to a first HARQ process; and
  receiving the data block associated with the first network identifier.

Embodiment 19: The method of Embodiment 16, further comprising:
  receiving a fourth DCI including a first HARQ process identifier; and
  receiving the data block associated with a second network identifier according to the first HARQ process identifier.

Embodiment 20: The method of Embodiment 16, wherein:
  the first DCI includes a first HARQ process identifier and a new data indicator, the first HARQ process identifier indicative of a first HARQ process;
  an initial transmission of the data block is associated with the first network identifier;
  the first UE receives a fifth DCI including the first HARQ process identifier and the new data indicator; and
  a retransmission of the data block is associated with a second network identifier.

Embodiment 21: The method of Embodiment 20, wherein:
  the fifth DCI includes the first HARQ process identifier and a first redundancy version (RV);
  the first UE receives the retransmission of the data block via a first unicast communication;

Embodiment 22: The method of Embodiment 21, wherein:
  a second UE receives a sixth DCI including the first HARQ process identifier and a second RV;
  the second UE receives the retransmission of the data block via a second unicast communication; and
  the first HARQ process is used for a new data block when no retransmission of the data block is necessary.

Embodiment 23: The method of Embodiment 1, further comprising: receiving a HARQ entity configuration for a RRC signaling message or a SIB message.

Embodiment 24: The method of Embodiment 23, further comprising:
  mapping an initial transmission of the data block and a retransmission of the data block to a HARQ entity.

Embodiment 25: The method of Embodiment 23, further comprising:
  mapping the first network identifier to a first HARQ entity;
  receiving the data block associated with the first network identifier; and
  delivering the data block to a HARQ process of the first HARQ entity.

Embodiment 26: The method of Embodiment 23, further comprising:
  receiving a seventh DCI including a first HARQ entity indicator indicating a first HARQ entity;
  receiving the data block associated with a second network identifier; and
  delivering the data block to a HARQ process of the first HARQ entity,
  wherein the first HARQ entity indicator includes an HARQ entity index and a third network identifier relevant to the second network identifier.

Embodiment 27: A method for hybrid automatic repeat request (HARQ), the method performed by a NodeB and comprising:
  transmitting an acknowledge configuration indicating an HARQ scheme of a first UE and uplink resource for the HARQ scheme; and
  transmitting a data block associated with a first downlink control information (DCI).

Embodiment 28: The method of Embodiment 27, wherein transmitting the acknowledge configuration includes: broadcasting the acknowledge configuration to UEs; groupcasting the acknowledge configuration to a group of UEs; and unicasting the acknowledge configuration to a UE.

Embodiment 29: The method of Embodiment 27, wherein the acknowledge configuration is indicated with an first network identifier transmitted in a RRC signaling message, and the method further comprises transmitting the first DCI indicating an initial transmission of the data block.

Embodiment 30: The method of Embodiment 27, wherein the acknowledge configuration is indicated in and transmitted with the first DCI.

Embodiment 31: The method of Embodiment 27, wherein the acknowledge configuration is broadcasted in a SIB message and the method further comprises transmitting the first DCI indicating a transmission of the data block.

Embodiment 32: The method of Embodiment 27, wherein the HARQ scheme is indicated by the number of allocated resources of the uplink resource for the HARQ scheme.

Embodiment 33: The method of Embodiment 27, wherein the acknowledge configuration is transmitted after the first UE join a MBS session.

Embodiment 34: The method of Embodiment 27, further comprising:
  transmitting a second DCI; and
  retransmitting the data block according to the second DCI.

Embodiment 35: The method of Embodiment 27, further comprising:
  receiving an acknowledgement through a common uplink resource allocated by the acknowledge configuration.

Embodiment 36: The method of Embodiment 27, further comprising: transmitting a third DCI including information related to a service and a first HARQ process identifier indicative of a first HARQ process.

Embodiment 37: The method of Embodiment 36, wherein the third DCI includes a first format for a MBS service and a second format for a non-MBS service.

Embodiment 38: The method of Embodiment 37, wherein the third DCI includes an indicator indicative of a type of the service.

Embodiment 39: The method of Embodiment 36, further comprising:
  transmitting initial transmissions of data blocks of different types of service, wherein the initial transmissions are assigned to the first HARQ process by the NobeB; and
  transmitting retransmissions of at least one of the data blocks, wherein the retransmissions are assigned to the first HARQ process by the NobeB.

Embodiment 40: The method of Embodiment 36, further comprising:
  transmitting data blocks of first service type, wherein the data blocks of the first service type are assigned to the first HARQ process by the NobeB; and
  transmitting data blocks of second service type, wherein the data blocks of the second service type are assigned to the first HARQ process by the NobeB.

Embodiment 41: The method of Embodiment 27, further comprising:
transmitting a HARQ process configuration for a RRC signaling message or a SIB message.

Embodiment 42: The method of Embodiment 41, further comprising:
storing an initial transmission of the data block and a retransmission of the data block into a HARQ process.

Embodiment 43: The method of Embodiment 41, further comprising:
mapping the first network identifier to a first HARQ process; and
transmitting the data block associated with the first network identifier.

Embodiment 44: The method of Embodiment 41, further comprising:
transmitting a fourth DCI including a first HARQ process identifier; and
transmitting the data block associated with a second network identifier according to the first HARQ process identifier.

Embodiment 45: The method of Embodiment 41, wherein:
the first DCI includes a first HARQ process identifier and a new data indicator, the first HARQ process identifier indicative of a first HARQ process;
an initial transmission of the data block is associated with the first network identifier;
the NodeB transmits a fifth DCI including the first HARQ process identifier and the new data indicator; and
the NodeB transmits a retransmission of the data block associated with a second network identifier.

Embodiment 46: The method of Embodiment 45, wherein:
the NodeB transmits the fifth DCI to a first UE, the fifth DCI including the first HARQ process identifier and a first redundancy version (RV); and
the NodeB transmits the retransmission of the data block to the first UE via a first unicast communication.

Embodiment 47: The method of Embodiment 46, wherein:
the NodeB transmits a sixth DCI to a second UE, the sixth DCI including the first HARQ process identifier and a second RV;
the NodeB transmits the retransmission of the data block to the second UE via a second unicast communication; and
the first HARQ process is used for a new data block when no retransmission of the data block is necessary.

Embodiment 48: The method of Embodiment 27, further comprising:
transmitting a HARQ entity configuration for a RRC signaling message or a SIB message.

Embodiment 49: The method of Embodiment 48, further comprising:
mapping an initial transmission of the data block and retransmission of the data block to a HARQ entity.

Embodiment 50: The method of Embodiment 48, further comprising:
mapping the first network identifier to a first HARQ entity; and
transmitting the data block associated with the first network identifier.

Embodiment 51: The method of Embodiment 48, further comprising:
transmitting a seventh DCI including a first HARQ entity indicator indicating a first HARQ entity; and
transmitting the data block associated with a second network identifier,
wherein the first HARQ entity indicator includes an HARQ entity index and a third network identifier relevant to the second network identifier.

Embodiment 52: An apparatus, comprising:
at least one non-transitory computer-readable medium having computer executable instructions stored therein;
at least one receiver;
at least one transmitter; and
at least one processor coupled to the at least one non-transitory computer-readable medium, the at least one receiver and the at least one transmitter;
wherein the computer executable instructions are programmed to implement a method according to any one of Embodiments 1-51 with the at least one receiver, the at least one transmitter and the at least one processor.

The method according to embodiments of the present disclosure can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. An apparatus A user equipment (UE) for wireless communication, comprising:
at least one memory; and
at least one processor coupled with the at least one memory and configured to cause the UE to:
receive signaling that indicates for the UE to transmit feedback for a data block associated with multicast and broadcast services (MBS), wherein the signaling or downlink control information (DCI) comprises a hybrid automatic repeat request (HARQ) scheme associated with the feedback for the data block and an uplink resource associated with the feedback for the data block; and
transmit the feedback for the data block based at least in part on the HARQ scheme and the uplink resource.

2. The UE of claim 1, wherein the at least one processor is further configured to cause the apparatus UE to receive the DCI, wherein the DCI indicates an initial transmission of the data block, and wherein the signaling comprises a radio resource control (RRC) signaling message comprising a network identifier that indicates for the UE to transmit the feedback for the data block associated with the MBS.

3. The UE of claim 1, wherein the DCI indicates for the UE to transmit the feedback for the data block associated with the MBS.

4. The UE of claim 1, wherein the at least one processor is further configured to cause the UE to receive the DCI, wherein the DCI indicates a transmission of the data block, and wherein the signaling comprises a system information block (SIB).

5. The UE of claim 1, wherein the at least one processor is configured to cause the UE to receive an additional DCI comprising information related to a service and a first HARQ process identifier indicative of a first HARQ process.

6. The UE of claim 5, wherein the additional DCI comprises a first format for the MBS and a second format for a non-MBS service.

7. The UE of claim 6, wherein the additional DCI comprises an indicator indicative of a type of service.

8. The UE of claim 5, wherein the at least one processor is further configured to cause the UE to:
receive data blocks of a first service type, wherein the data blocks of the first service type are assigned to the first HARQ process;
store the data blocks of the first service type in a second HARQ process;
receive data blocks of a second service type, wherein the data blocks of the second service type are assigned to the first HARQ process; and
store the data blocks of the second service type in a third HARQ process, wherein a mapping between the first service type and the second HARQ process and a mapping between the second service type and the third HARQ process are stored at the UE.

9. The UE of claim 1, wherein the at least one processor is further configured to cause the UE to receive a HARQ process configuration for one or more of a radio resource control (RRC) signaling message or a system information block (SIB) message.

10. The UE of claim 9, wherein the at least one processor is further configured to cause the UE to:
receive an additional DCI comprising a first HARQ process identifier; and
receive the data block according to the first HARQ process identifier, wherein the data block is associated with a network identifier.

11. The UE of claim 9, wherein the DCI comprises a first HARQ process identifier and a new data indicator, the first HARQ process identifier indicative of a first HARQ process, an initial transmission of the data block is associated with a first network identifier, and the at least one processor is further configured to cause the UE to receive a first additional DCI comprising the first HARQ process identifier and the new data indicator, wherein a retransmission of the data block is associated with a second network identifier.

12. The UE of claim 11, wherein the at least one processor is further configured to cause the UE to receive the retransmission of the data block via a first unicast communication, wherein a second additional DCI comprises the first HARQ process identifier and a first redundance version (RV).

13. The UE of claim 12, wherein:
the second additional DCI is associated with a plurality of UEs;
the retransmission of the data block is associated with respective unicast communication corresponding to the plurality of UEs; and
the first HARQ process is associated with a new data block based at least in part on the data block being received successfully.

14. The UE of claim 1, wherein the at least one processor is further configured to cause the UE to receive a HARQ entity configuration for one or more of a radio resource control (RRC) signaling message or a system information block (SIB) message.

15. The UE of claim 14, wherein the at least one processor is further configured to cause the UE to:
receive an additional DCI comprising a first HARQ entity indicator indicating a first HARQ entity;
receive the data block, wherein the data block is associated with a first network identifier; and
deliver the data block to a HARQ process of the first HARQ entity, wherein the first HARQ entity indicator comprises a HARQ entity index and a second network identifier relevant to the first network identifier.

16. A network equipment (NE) for wireless communication, comprising:
at least one memory; and
at least one processor coupled with the at least one memory and configured to cause the NE to:
transmit signaling that indicates for one or more user equipment (UEs) to transmit feedback for a data block associated with multicast and broadcast services (MBS), wherein the signaling or downlink control information (DCI) comprises a hybrid automatic repeat request (HARQ) scheme associated with the feedback for the data block and an uplink resource associated with the feedback for the data block; and transmit, based at least in part on the DCI, the data block associated with the MBS.

17. The NE of claim 16, wherein to transmit the signaling, the at least one processor is configured to cause the NE to one or more of:
broadcast the signaling to the one or more UEs;
groupcast the signaling to a group of UEs comprising the one or more UEs; or
unicast the signaling to a UE of the one or more UEs.

18. The NE of claim 16, wherein the at least one processor is further configured to case the NE to transmit the DCI, wherein the DCI indicates an initial transmission of the data block, and wherein the signaling comprises a radio resource control (RRC) signaling message comprising a network identifier that indicates for the one or more UEs to transmit the feedback for the data block associated with the MBS.

19. A method performed by a user equipment (UE), the method comprising:
receiving signaling that indicates for the UE to transmit feedback for a data block associated with multicast and broadcast services (MBS), wherein the signaling or downlink control information (DCI) comprises a hybrid automatic repeat request (HARQ) scheme associated with the feedback for the data block and an uplink resource associated with the feedback for the data block; and
transmit the feedback for the data block based at least in part on the HARQ scheme and the uplink resource.

20. A processor for wireless communication, comprising:
at least one controller coupled with at least one memory and configured to cause the processor to:
receive signaling that indicates for the processor to transmit feedback for a data block associated with multicast and broadcast services (MBS), wherein the signaling or downlink control information (DCI) comprises a hybrid automatic repeat request (HARQ) scheme associated with the feedback for the data block and an uplink resource associated with the feedback for the data block; and
transmit the feedback for the data block based at least in part on the HARQ scheme and the uplink resource.

* * * * *